US010373396B2

(12) United States Patent
Tomer

(10) Patent No.: US 10,373,396 B2
(45) Date of Patent: Aug. 6, 2019

(54) METHODS AND SYSTEMS OF MANAGING PARKING SPACE OCCUPANCY

(71) Applicant: Natan Tomer, Tel-Aviv (IL)

(72) Inventor: Natan Tomer, Tel-Aviv (IL)

(*) Notice: Subject to any disclaimer, the term of this patent is extended or adjusted under 35 U.S.C. 154(b) by 0 days.

(21) Appl. No.: 15/469,536

(22) Filed: Mar. 26, 2017

(65) Prior Publication Data

US 2017/0200320 A1     Jul. 13, 2017

Related U.S. Application Data

(63) Continuation-in-part of application No. PCT/IL2015/050976, filed on Sep. 24, 2015.

(60) Provisional application No. 62/055,678, filed on Sep. 26, 2014.

(51) Int. Cl.
| | |
|---|---|
| *G06Q 30/06* | (2012.01) |
| *G07B 15/00* | (2011.01) |
| *G08G 1/14* | (2006.01) |
| *G06Q 20/14* | (2012.01) |
| *G07B 15/02* | (2011.01) |

(52) U.S. Cl.
CPC .......... *G07B 15/00* (2013.01); *G06Q 20/145* (2013.01); *G08G 1/14* (2013.01); *G08G 1/144* (2013.01); *G08G 1/147* (2013.01); *G07B 15/02* (2013.01)

(58) Field of Classification Search
USPC .............. 705/13, 1.1, 7.11, 5, 6; 455/456.1; 701/1, 8, 22
See application file for complete search history.

(56) References Cited

U.S. PATENT DOCUMENTS

| | | | |
|---|---|---|---|
| 6,243,029 | B1 | 6/2001 | Tomer |
| 2002/0007291 | A1 | 1/2002 | Miller et al. |
| 2003/0162536 | A1 | 8/2003 | Panico |
| 2010/0280956 | A1* | 11/2010 | Chutorash ............. G06Q 20/20 705/64 |

(Continued)

FOREIGN PATENT DOCUMENTS

| | | |
|---|---|---|
| WO | WO 2014/072909 | 5/2014 |
| WO | WO 2016/046831 | 3/2016 |

OTHER PUBLICATIONS

Office Action dated Sep. 18, 2017 From the Israel Patent Office Re. Application No. 251393 and Its Translation Into English. (7 Pages).

(Continued)

*Primary Examiner* — Akiba K Allen

(57) ABSTRACT

A method of calculating a parking fee in a public parking space based on coordinating a transfer of a parking space between vehicles and automatically decreasing the fee accordingly, comprising: creating a command to continuously increase a calculated parking fee for a parked vehicle currently occupying a public parking space, based on duration of the occupying; receiving a message from a client terminal associated with the parked vehicle, the message includes a notification of future departure of the parked vehicle from the public parking space; selecting an arriving vehicle to occupy the public parking space when the parked vehicle is departing, based on an estimated time of the future departure and a current location of the arriving vehicle; and creating a command to halt the increasing of the calculated parking fee before identifying a transfer of the public parking space.

13 Claims, 5 Drawing Sheets

(56) References Cited

U.S. PATENT DOCUMENTS

| | | | | |
|---|---|---|---|---|
| 2013/0325564 A1* | 12/2013 | Kwong | ............... | G06Q 10/06 |
| | | | | 705/13 |
| 2015/0127477 A1* | 5/2015 | Urquhart | ............ | G06Q 20/10 |
| | | | | 705/21 |
| 2015/0279213 A1* | 10/2015 | Baiter | ................ | G08G 1/144 |
| | | | | 705/13 |
| 2017/0249607 A1* | 8/2017 | Samid | ............. | G06Q 20/0655 |

OTHER PUBLICATIONS

International Preliminary Report on Patentability dated Apr. 6, 2017 From the International Bureau of WIPO Re. Application No. PCT/IL2015/050976. (6 Pages).
International Search Report and the Written Opinion dated Jan. 20, 2016 From the International Searching Authority Re. Application No. PCT/IL2015/050976.

\* cited by examiner

METHODS AND SYSTEMS OF MANAGING PARKING SPACE OCCUPANCY

RELATED APPLICATIONS

This application is a Continuation-in-Part (CIP) of PCT Patent Application No. PCT/IL2015/050976 having International filing date of Sep. 24, 2015, which claims the benefit of priority under 35 USC § 119(e) of U.S. Provisional Patent Application No. 62/055,678 filed on Sep. 26, 2014. The contents of the above applications are all incorporated by reference as if fully set forth herein in their entirety.

FIELD AND BACKGROUND OF THE INVENTION

The present invention, in some embodiments thereof, relates to management of parking space occupancy and, more particularly, but not exclusively, to coordinated parking space transfer, based on arrival and departure times of vehicles.

Conventional parking meters are widely used to control vehicular parking and to encourage turnover in limited parking areas. These parking meters also provide a substantial source of income to the municipality or other organization using such meters. Some newer meters now provide printed receipts.

Alternatively, a number of municipalities have adopted the use of parking coupons. The coupons have tear out sections which indicate the date and the expiration time of a particular parking period, and the coupons being displayed from inside of the vehicle by wedging the coupon into the upper end of a closed window.

Other municipalities have adopted the use of parking location sensors mounted in, near or on the surface of the parking location. The sensor notifies a central control unit of the presence or absence of a vehicle in the parking location.

Yet other municipalities have adopted the use of a time metering device that is useful as a prepaid in car electronic parking meter card. The device is a unitary electronic card purchased in advance by the user to provide a pre-purchased time period value that may be used as and when desired by the user for parking his vehicle. The card has buttons to select the type of parking zone required, a timer clock showing the amount of purchased time remaining on the card, and switches to start and stop the timer clock. Thus, the user pays for only the actual time that a vehicle occupies a parking space. The card device is displayed within the vehicle during the time the vehicle occupies the parking location.

Another method of monitoring and assessing a fee for parking a vehicle in a toll parking location includes providing indication for a toll parking location and unique indication for a vehicle to be positioned in that parking location. The user notifies a central control unit the location indication, the vehicle unique indication, and the start time of parking the vehicle in the location. Later, the user notifies a central control unit the vehicle unique indication, and the finish time of parking the vehicle in the location. The central control unit then assesses a fee to the user for the duration of time the vehicle occupied the parking location.

Some applications for mobile devices includes monitoring of available parking spaces and of vehicles that are departing a parking space. Some of these applications present a map of these parking spaces to a driver of a vehicle searching for parking.

SUMMARY OF THE INVENTION

According to an aspect of some embodiments of the present invention there is provided a method of coordinating a transfer of a parking space between vehicles based on location of client terminals and calculated estimation of arrival times, comprising: monitoring locations of a plurality of client terminals, each associated with a vehicle occupying a public parking space, via a location sensor of each of the plurality of client terminals; estimating a departure time of each of the plurality of vehicles from of each the corresponding public parking space; receiving a request from an arriving client terminal to find a parking space for an arriving vehicle associated with the arriving client terminal; estimating an arrival time of the arriving vehicle to each of the plurality of public parking spaces based on a current location of the arriving client terminal; matching between the arriving client terminal and a departing client terminal of the plurality of client terminals, based on correlation between the estimated departure time of a departing vehicle associated with the departing client terminal from a selected public parking space currently occupied by the departing vehicle, and the estimated arrival time of the arriving vehicle to the selected public parking space; and identifying a transfer of the public parking space from the departing vehicle to the arriving vehicle.

According to an aspect of some embodiments of the present invention there is provided a method of coordinating a transfer of a parking space between vehicles based on location of client terminals and calculated estimation of arrival times, comprising: monitoring locations of a plurality of client terminals, each associated with a vehicle occupying a public parking space, via a location sensor of each of the plurality of client terminals; estimating a departure time of each of the plurality of vehicles from each the corresponding public parking space; receiving a request from an arriving client terminal to find a parking space for an arriving vehicle associated with the arriving client terminal; estimating an arrival time of the arriving vehicle to each of the plurality of public parking spaces based on a current location of the arriving client terminal; matching between the arriving client terminal and a departing client terminal of the plurality of client terminals, based on correlation between the estimated departure time of a departing vehicle associated with the departing client terminal from a selected public parking space currently occupied by the departing vehicle, and the estimated arrival time of the arriving vehicle to the selected public parking space; and sending instructions to arriving client terminal for driving to a location of the public parking space, wherein the instructions are adjusted so that an actual arrival time of the arriving vehicle to the selected public parking space is closer to the estimated departure time than the estimated arrival time. This allows better accuracy in meeting time between the vehicles and minimizes waiting time.

According to an aspect of some embodiments of the present invention there is provided a method of coordinating a transfer of a parking space between vehicles based on location of client terminals and calculated estimation of arrival times, comprising: monitoring locations of a plurality of client terminals, each associated with a vehicle occupying a public parking space, via a location sensor of each of the plurality of client terminals; estimating a departure time of each of the plurality of vehicles from each the corresponding public parking space; receiving a request from an arriving client terminal to find a parking space for an arriving vehicle associated with the arriving client terminal; estimating an arrival time of the arriving vehicle to each of the plurality of public parking spaces based on a current location of the arriving client terminal; matching between the arriving client terminal and a departing client terminal of the plurality of client terminals associated with a departing vehicle currently occupying a selected public parking space; sending instructions to arriving client terminal for driving to a location of the departing client terminal; and sending instructions to arriving client terminal for driving to a location of the public parking space. This provides certainty for the arriving driver that the parking spot is reserved for him, and also minimizes or even eliminates potential waiting time.

Optionally, the estimating of departure time is done according to a distance of a current location of each of the plurality of client terminals from each the corresponding public parking space. This is based on an estimation of the driver's arrival time to his parked vehicle.

Optionally, the estimating of an arrival time is done according to at least one of distance and traffic load of a current location of the arriving client terminal from each of the plurality of public parking spaces. This is based on estimated driving time to each potential parking spot.

Optionally, the method further comprises: creating a command to continuously increase a calculated parking fee for the departing vehicle, based on duration of occupying the public parking space; receiving confirmation from the arriving client terminal to occupy the selected public parking space; and creating a command to halt the increasing of the calculated parking fee before identifying the transfer of the public parking space. This creates an incentive for the driver of the parked vehicle to find an arriving vehicle, as it may decrease his parking fee.

Optionally, the method further comprises: receiving a message from one of the plurality of client terminals, the message includes a notification of future departure of the associated parked vehicle from the corresponding public parking space and used for the matching.

Optionally, the method further comprises: presenting the locations of the plurality of client terminals in a user interface of the arriving client terminal so a location may be selected.

More optionally, the user interface includes a map of the locations of the plurality of client terminals.

More optionally, the user interface further includes the estimated departure times of each of the plurality of vehicles.

Optionally, the method further comprises: sending a location of the selected public parking space to the arriving client terminal to be presented in a user interface on a screen of the arriving client terminal.

Optionally, the matching includes finding an estimated departure time which is earlier than the estimated arrival time, so the parked vehicle is waiting for the arriving vehicle.

More optionally, a user of the departing client terminal is asked to wait for the arrival of the arriving vehicle, so the selected public parking space is not occupied by another vehicle before the arrival.

Optionally, the matching is done according to a selection made by at least one of a user of the departing client terminal and a user of the arriving client terminal.

Optionally, the matching includes bidding by a plurality of users of arriving client terminals on the selected public parking space.

Optionally, the matching is further based on prioritizing the arriving client terminal based on accumulated credit of the arriving client terminal.

Optionally, the matching is further based on predetermined parking end time, when a user of the arriving client terminal is committed to remove the arriving vehicle from the selected public parking space.

Optionally, the method further comprises: providing a communication method between the departing client terminal and the arriving client terminal to coordinate transfer of the selected public parking space.

Optionally, the method further comprises: presenting commercial content on a screen of at least one of the departing client terminal and the arriving client terminal, based on the location of the selected public parking space.

According to some embodiments of the invention there is provided a non-transitory computer readable storage medium encoded with instructions that, when loaded into a computer, establish a machine performing a computer-implemented method.

According to an aspect of some embodiments of the present invention there is provided a method of calculating a parking fee in a public parking space based on coordinating a transfer of a parking space between vehicles and automatically decreasing the fee accordingly, comprising: creating a command to continuously increase a calculated parking fee for a parked vehicle currently occupying a public parking space, based on duration of the occupying; receiving a message from a client terminal associated with the parked vehicle, the message includes a notification of future departure of the parked vehicle from the public parking space; selecting an arriving vehicle to occupy the public parking space when the parked vehicle is departing, based on an estimated time of the future departure and a current location of an arriving client terminal associated with the arriving vehicle; and creating a command to halt the increasing of the calculated parking fee before identifying the transfer of the public parking space. This creates an incentive for the driver of the parked vehicle to find an arriving vehicle, as it may decrease his parking fee.

Optionally, the halting also includes creating a command to continuously increase a calculated parking fee for the arriving vehicle, so the arriving driver pays for having a parking spot found.

Optionally, the halting is done according to a time of the message.

Optionally, the halting is done according to a time of the selecting.

Optionally, the method further comprises: sending a location of the public parking space to the arriving client terminal to be presented in a user interface on a screen of the arriving client terminal.

Optionally, the method further comprises: receiving confirmation from the arriving client terminal to occupy the public parking space.

More optionally, the halting is done according to a time of the confirmation.

Optionally, the halting also includes continuously decreasing the calculated parking fee. This creates further incentive for the driver of the parked vehicle to find an arriving vehicle and/or to continue waiting for the arriving vehicle.

Optionally, the method further comprises: when a transfer of the public parking space is not performed, the halting is canceled. This creates an incentive for the driver of the parked vehicle to wait for the completion of the successful transfer.

Optionally, the commands are sent to a billing system.

According to some embodiments of the invention there is provided a non-transitory computer readable storage medium encoded with instructions that, when loaded into a computer, establish a machine performing the method.

According to an aspect of some embodiments of the present invention there is provided a system of calculating a parking fee in a public parking space based on coordinating a transfer of a parking space between vehicles according to location of client terminals and calculated estimation of arrival times, comprising: a program store storing code; and a processor coupled to the interface and the program store for implementing the stored code, the code comprising: code to create a command to continuously increase a calculated parking fee for a parked vehicle currently occupying a public parking space, based on duration of the occupying; code to receive a message from a client terminal associated with the parked vehicle, the message includes a notification of future departure of the parked vehicle from the public parking space; code to select an arriving vehicle to occupy the public parking space when the parked vehicle is departing, based on an estimated time of the future departure and a current location of an arriving client terminal associated with the arriving vehicle; and code to create a command to halt the increasing of the calculated parking fee before identifying a transfer of the public parking space.

According to an aspect of some embodiments of the present invention there is provided a system of coordinating a transfer of a parking space between vehicles based on location of client terminals and calculated estimation of arrival times, comprising: an interface for communicating with a plurality of client terminals, each associated with a vehicle occupying a public parking space; a program store storing code; and a processor coupled to the interface and the program store for implementing the stored code, the code comprising: code to monitor locations of the plurality of client terminals via a location sensor of each of the plurality of client terminals; code to estimate a departure time of each of the plurality of vehicles from each the corresponding public parking space; code to estimate an arrival time of the arriving vehicle to each of the plurality of public parking spaces based on a current location of the arriving client terminal; code to match between the arriving client terminal and a departing client terminal of the plurality of client terminals, based on correlation between the estimated departure time of a departing vehicle associated with the departing client terminal from a selected public parking space currently occupied by the departing vehicle, and the estimated arrival time of the arriving vehicle to the selected public parking space; and code to identify a transfer of the public parking space from the departing vehicle to the arriving vehicle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
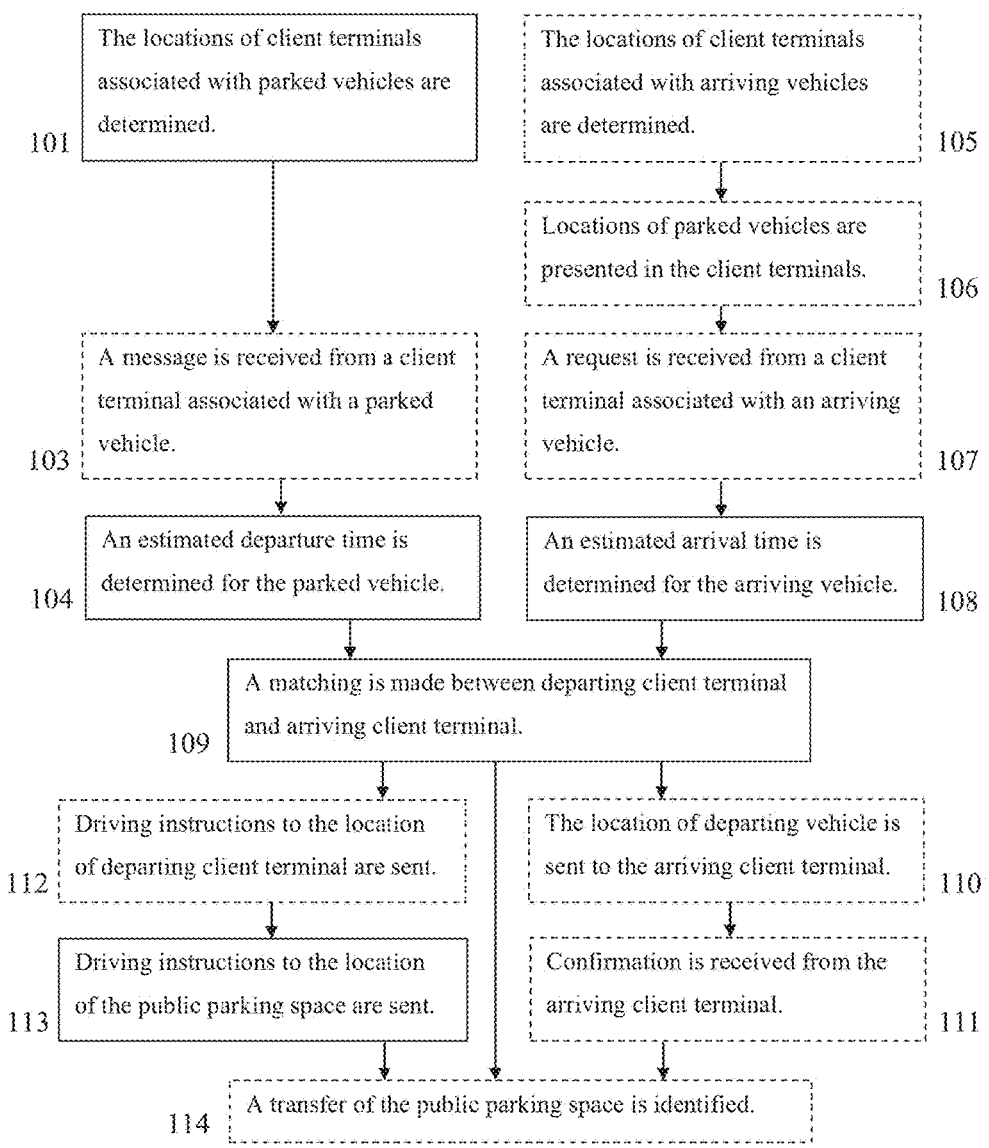
FIG. 1 is a flowchart schematically representing a method for coordinating a transfer of a parking space between vehicles, according to some embodiments of the present invention.

The present invention, in some embodiments thereof, relates to management of parking space occupancy and, more particularly, but not exclusively, to coordinated parking space transfer, based on arrival and departure times of vehicles.

According to some embodiments of the present invention, there are provided methods and systems for coordinating a transfer of a parking space between vehicles, based on at least current location and coordination of departure and arrival times of the vehicles. A server is connected to multiple client terminals, such as mobile smartphones and network connected infotainment devices, each associated with a vehicle, for example driven by a user of the client terminal. The server monitors the location of each client terminal, which is determined by a location sensor of the client terminal, and/or monitors the location of the vehicle associated with the client terminal, parked in a public parking space. The server estimates departure times of vehicles from the public parking spaces and arrival times of vehicles of users looking for a parking space to these public parking spaces. The server then matches between a departing vehicle and an arriving vehicle based on correlation of the estimated times, to coordinate a transfer of the parking space. Optionally, instructions for driving to the parking space are sent to the arriving client terminal. The instructions may be adjusted (for example by taking a longer route and/or a route with less traffic load) so the arrival time is closer to the departure time of the departing vehicle to allows better accuracy in meeting time and minimizes or eliminates waiting time. Optionally, the arriving vehicle is first instructed to arrive to the location of the departing client terminal, to pick up the driver of the departing vehicle and drive him to the parking spot. This provides certainty for the arriving driver that the parking spot is reserved for him, and also eliminates potential waiting time.

According to some embodiments of the present invention, there is provided a method for calculating a parking fee in a public parking space. When a match is made between a departing vehicle and an arriving vehicle, the fee for the public parking space stops increasing for the departing vehicle, and is optionally paid by the user of the arriving vehicle, for example from the moment of the match, before an actual transfer of the parking space between the vehicles is actually made. This creates an incentive for the driver of the departing vehicle to find an arriving vehicle to replace him and also to wait if necessary, as it may decrease his parking fee. The driver of the arriving vehicle may be willing to pay the increased fee in order to ensure that a parking spot is available for him when he arrives.

The methods and systems according to some embodiments of the present invention may be combined with existing systems and/or devices related to parking, such as described by the Applicant in U.S. Pat. No. 6,243,029.

According to some researches, approximately 30 percent of vehicles driving in large cities at a given moment are drivers searching for a parking space. On average, each driver may spend more than 10 minutes circling to find parking. This creates more pollution and extra traffic load. Implementation of some embodiments of the present invention may decrease this traffic and pollution by allowing drivers to drive directly to an available parking space.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
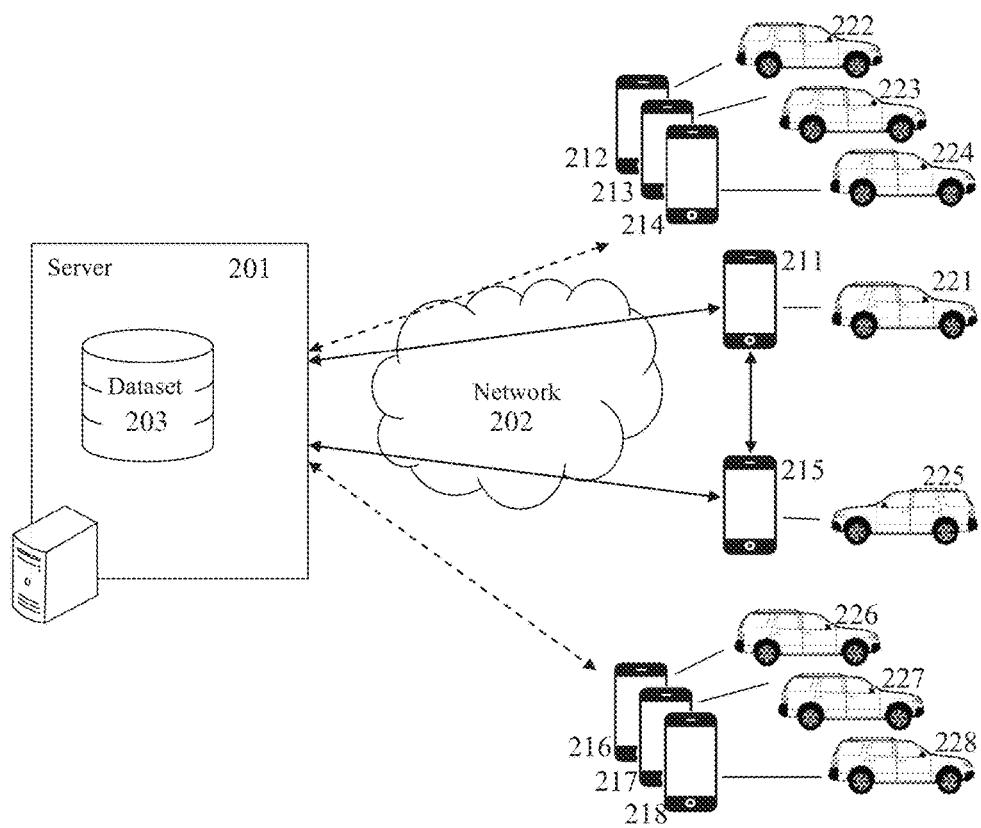
FIG. 2 is a schematic illustration of a system of coordinating a transfer of a parking space between vehicles and/or calculating a parking fee in a public parking space, according to some embodiments of the present invention.

Referring now to the drawings, FIG. 1 is a flowchart schematically representing a method for coordinating a transfer of a parking space between vehicles and/or calculating a parking fee in a public parking space, based on current location and a correlation between estimated departure and arrival times of the vehicles, according to some embodiments of the present invention. Reference is also made to FIG. 2, which is a schematic illustration of a system of coordinating a transfer of a parking space between vehicles, according to some embodiments of the present invention.

The presented method and system provide a solution to the problem of efficiently and quickly locating parking spaces for vehicles in high demand areas such as central cities, and the challenge of alerting drivers of potentially available parking spaces. The solution includes estimation of departure and arrival times based on locations of associated client terminals, such as mobile smartphones, and automatic matching of departing and arriving vehicles for a transfer of the parking space. The indication of a match and of the potentially available parking space is transmitted to the client terminals over a network. The solution also includes an easy way of transferring the payment of parking fees, from the moment of the match, thus providing an incentive for departing drivers to match with arriving drivers and transfer the parking space.

System 200 includes a server 201, connected via a network 202 to multiple client terminals, each associated with a vehicle, for example a vehicle that is owned or driven by the user of each client terminal.

A vehicle may include, for example, a car such as economy car, compact car, executive car, sports car, minivan, van and/or sports utility vehicle (SUV), a larger vehicle such as a bus, and/or truck, smaller vehicles such as a motorcycle and/or any other vehicle that may be parked in a parking space.

Server 201 may include one or more computing devices, for example, a mainframe computer, an enterprise server, a workstation, multiple connected computers, one or more virtual machines and/or a personal computer.

Network 202 may include, for example, local area network (LAN), a wireless network such as mobile network, wireless local area network (WLAN) such as Wireless Fidelity (WiFi™), a wireless personal area network (WPAN) such as Bluetooth™ protocol, near-field communication (NFC) and/or any other network.

A client terminal may include, for example, a mobile device such as a smartphone, a tablet, a wearable device such as Google glass, a Smart watch, a laptop computer, one or more virtual machines, and/or any electronic device that has one or more network communication modules, such as a network card or chip. Each client terminal includes a location sensor which determines the geographic location of the client terminal. This may be done, for example, by a global positioning system (GPS) device, by cellular network positioning, by WiFi networks and/or by any other method and/or combination thereof. Optionally, the location sensor also determines the speed of the client terminal, for example by a speed sensor and/or by continuously monitoring the geographic location of the client terminal. Optionally, due to inaccuracy of the location sensor, calculated locations and/or times may not be accurate. This may be presented to the user of client terminal as a warning before using the system. Optionally, when the vehicle is autonomous, the client terminal may be included in the vehicle's computer and/or may be connected to the vehicle's computer.

When a client terminal is located in a vehicle, the location of the client terminal indicated the location of the vehicle. When a client terminal is located outside the vehicle, the location of the client terminal may indicate the distance of the user of the client terminal from the vehicle, which may be parked at a known parking space. This may be discovered for example, by an indication from the user of the client terminal and/or by the location and/or speed of movement of the client terminal. For example, when the average speed of movement of the client terminal is a driving speed, such as between 15 kilometers per hour (km/h) and 50 km/h and the client terminal is located on a road, the client terminal is assumed to be in the vehicle. For example, when the client terminal is substantially stationary for a period of time after moving in a driving speed, the client terminal may be assumed to be in a parked vehicle. The location of the parked vehicle (as opposed to the location of the client terminal) may be determined, for example, by the location of the client terminal when the car was parked and/or based on a known location of the public parking space.

First, as shown at 101, the location of multiple client terminals, for example client terminals 211-214, is determined by the location sensors of client terminals 211-214, and monitored by server 201 via network 202. Each of client terminals 211-214 is associated with a parked vehicle 221-224 currently occupying a public parking space.

A public parking space may include a street parking space managed by the city, a parking space inside a public parking lot, a private parking space or a privately owned parking lot offered for temporary or permanent public use and/or any other space offered for parking a vehicle.

Optionally, client terminals 211-214 are used by users who are members of a group, for example, residents of a neighborhood or a building and/or members of a parking program.

Optionally, the locations of client terminals 211-214 are stored in a dataset 203 of server 201. Dataset 203 may be any kind of structured data collection that allows access to stored data. Dataset 203 may be stored, for example, in a digital data storage unit such as a magnetic drive and/or a solid state drive. Database 203 may also be, for example, a content delivery network or content distribution network (CDN) is a large distributed system of servers deployed in multiple data centers across the Internet.

Optionally, as shown at 103, a message is received by server 201 from a client terminal 211 associated with a parked vehicle 221, that includes a notification of future departure of parked vehicle 221 from the public parking space. The message may also include an estimated departure time entered by the user of client terminal 211. For example, an interface may be presented to the user on the screen of client terminal 211 having a user interface with an input method for entering an estimated departure time. The user interface may also include an option to open a bidding process over the parking space.

Then, as shown at 104, an estimated departure time is determined for parked vehicle 221 from the public parking space. This may be done, for example, based on the current distance of client terminal 211 from vehicle 221, according to statistic past departure times of vehicle 221 and/or other vehicles and/or according to a predetermined departure time entered by the user of client terminal 211 at an earlier time or as indicated in a message received by server 201 that includes a notification of future departure. Optionally, an estimated departure time is determined for some or all of parked vehicles 221-224 from each public parking space.

Also, optionally, as shown at 105, the location of multiple client terminals, for example 215-218, is also determined by the location sensors of client terminals 215-218, and also monitored by server 201 via network 202. Each of client terminals 215-218 is associated with a vehicle 225-228 currently moving, and may be requiring a parking space.

Then, optionally, as shown at 106, the locations of some or all of parked vehicles 221-224 are presented in a user interface on the screens of some or all of client terminals 215-218. The locations may be presented, for example, on a map that includes markings indicating the locations of the parking space occupied by parked vehicles 221-224. The markings may include, for example, a letter, a number, a symbol, a colored shape and/or any other mark. Optionally, the estimated departure times of some or all of parked vehicles 221-224 are also presented in the user interface.

Then, optionally, as shown at 107, a request is received by server 201 from an arriving client terminal 115 to find a parking space for an arriving vehicle 225 associated with arriving client terminal 115. Optionally, the request may be received in advance for a later time, for example one day before a planned drive. The message may also include a desired area of the parking space. This may be indicated by the user of client terminal 115, for example by selecting a location point on a map presented in a user interface on the screen of client terminal 115 and selecting a desired perimeter from the location point. This may also be done automatically by client terminal 115, for example based on a location indicated in a navigation system and/or according to previous drives. Optionally, the message may include a preferred location of arrival and optionally a maximal distance from the location for a desired parking.

Optionally, client terminal 115 may be a part of and/or connected to an automatic driver system, for example in a driverless vehicle. The current location of client terminal 115 may also be selected as the location point.

Then, as shown at 108, an estimated arrival time is determined for arriving vehicle 225 to some or all of the locations of the parking space occupied by parked vehicles 221-224. The estimated arrival time is determined, for example, according to the current location of arriving vehicle 225 and based on driving algorithms estimating traffic times. Optionally, the estimated arrival time is determined according to previous arrival times of arriving vehicle 225, for example when a person drives to work every day. Optionally, an estimated arrival time is determined for some or all of vehicles 225-228, each to some or all of the locations of the parking space occupied by parked vehicles 221-224.

Optionally, the locations of some or all of arriving vehicles 225-228 are presented in a user interface on the screens of some or all of client terminals 211-214. The locations may be presented, for example, on a map that includes markings indicating the current locations of arriving vehicles 225-228, as described above, and may also include the estimated arrival times of each of arriving vehicles 225-228 to the relevant parking space of each of parked vehicles 221-224. Optionally, the map also includes parked vehicles 221-224 and may also be presented in a user interface on the screens of some or all of client terminals 215-218. Optionally, parked vehicles 221-224 and arriving vehicles 225-228 are differentiated by color, for example blue for arriving vehicles and green for parked vehicles. Optionally, the color of the presented vehicles may change according to the status and/or time, for example, the color of a parked vehicle may gradually change from blue to red when the time for departure from the public parking space is approaching.

Then, as shown at 109, a matching is made between departing client terminal 211 and arriving client terminal 215, so that arriving vehicle 225 is to occupy the public parking space currently occupied by departing vehicle 221. The matching is based on correlation between the estimated departure time of departing vehicle 221 and the estimated arrival time of arriving vehicle 225 to the public parking space occupied by departing vehicle 221.

Optionally, the matching is done by finding the most similar estimated departure time and estimated arrival time of parked vehicles 221-224 and arriving vehicles 225-228. Optionally, the matching is done by finding an estimated departure time which is earlier than an estimated arrival time, so the parked vehicle is waiting for the arriving vehicle. Optionally, when the estimated departure time of departing vehicle 221 is earlier than the estimated arrival time of arriving vehicle 225, the user of departing client terminal 211 is asked to wait for the arrival of arriving vehicle 225, so the parking space is not occupied by another vehicle before the arrival of arriving vehicle 225.

Optionally, the matching is done based on the preferred location indicated by the user of arriving client terminal 215, for example by searching first in an area closest to the preferred location and when a match is not found, searching in a larger distance from the preferred location. This may be repeated until the maximal distance defined by the user of arriving client terminal 215 is searched.

Optionally, in order to achieve a seamless match, communication is possible between arriving client terminal 215 and departing client terminal 211 to alert to any changing road or other conditions. Optionally, identification details are provided to the user of arriving client terminal 215 and/or to the user of departing client terminal 211, for example a partial plate number, color and/or type of departing vehicle 221 and/or arriving vehicle 225 respectively.

Optionally, the matching is done by the user of arriving client terminal 215, by selecting a parking space from the marked parking spaces presented on the screen of arriving client terminal 215. Optionally, the matching is done by the user of departing client terminal 211, by selecting arriving vehicle 225 from the ones presented on the screen of departing client terminal 211.

Optionally, the matching is also based on sizes of departing vehicle 221, arriving vehicle 225 and/or the parking space. The sizes of vehicles may be received, for example, from a database located in a memory of server 201, as described for dataset 203 and/or at a remote server or network. The size of departing vehicle 221 may be indicated when a match is searched, and only arriving vehicles of the same or smaller sizes are matched. For example, when departing vehicle 221 is an SUV, the probability of a match is increased, so a small arriving vehicle 225 such as a mini-car may be matched and also larger vehicles. Optionally, categories are used for defining vehicle sizes and potential problem, for example, a standard vehicle size, a larger than average vehicle and a smaller than average vehicle. Optionally, the number of effective parking spots on a street is calculated based on sizes of currently parked vehicles, for example, when large vehicles are currently parked, less effective parking spots may be available for transfer to arriving vehicles.

Optionally, a waiting list for a parking space is created of the arriving vehicles which may be matched with departing vehicle 221. When a match is canceled, for example by the user of arriving client terminal 215, another arriving vehicle may be matched with departing vehicle 221 to occupy the parking space. The existence of the waiting list and/or the waiting list itself may be presented or not presented to the user of arriving client terminal 215 and/or the user of departing client terminal 211.

Optionally, the matching includes bidding over a parking space. For example, the marked parking space of departing vehicle 221 that is presented on the screen of arriving client terminal 215 includes a reward suggestion such as time value, and/or an option for the user of arriving client terminal 215 to suggest a reward for the parking space. For example, the user of arriving client terminal 215 may suggest a price to reward for a parking space, for example at a certain area, and the user of departing client terminal 211 may answer to the bid and suggest to transfer the parking space of departing vehicle 221 to arriving vehicle 225. The reward may be paid, for example, to the user of departing client terminal 211, may be reduces from the calculated parking fee for departing vehicle 221, may be added to a parking fee that is to be calculated for arriving vehicle 225 and/or may be credited to the user of departing client terminal 211 in points and/or any other method. Optionally, the bid may include an increase of the parking fee for arriving vehicle 225 and decrease of the parking fee for departing vehicle 221 at the amount of the fee or at a different rate, such as double or triple the fee based on the time between the match and the transfer of the parking space. Optionally, the reward may be decided by the user of departing client terminal 211, may be limited or defined by the municipality and/or may be defined according to current parking demand.

Optionally, the matching is also based on accumulated credit or points in the system. For example, a priority for matching is given to a user of an arriving client terminal having more credit or points, a priority for matching is paid for by a user of an arriving client terminal using credit or points and/or the possibility to find a match is only allowed to a user of an arriving client terminal having a certain amount of credit or points. Points may be allocated, for example, based on the number of successful and/or smoothness of transfers of public parking spaces.

Optionally, the matching is also based on predetermined parking time. For example, a user of a departing client terminal 211 matches only with a user of an arriving client terminal 215 that is committed to depart from the parking space at a specific time. For example, a match is made for transferring the parking space at 8:00 and a commitment is made to transfer back at 19:00.

Optionally, the matching is made between departing client terminal 211 and arriving client terminal 215 directly via peer-to-peer (P2P) communication, without sending information to server 201. For example, arriving client terminal 215 is connected to client terminals 211-214 and selects the parking space of departing vehicle 221.

Optionally, a suggested match is given a score, indicating the quality of the match, for example according to the similarity between the estimated arrival time and estimated departure time. Optionally, when a match with better score is found by server 201, it is suggested to the users instead of existing suggested match and/or automatically replaced. Optionally, a change is limited, for example by a certain time before the departure time of departing vehicle 221 and/or the arrival time of arriving vehicle 225, for example 2 minutes before the predicted departure time.

Then, as shown at 110, the location of departing vehicle 221 is sent to arriving client terminal 215 from server 201, to indicate the matching. The location of departing vehicle 221 is presented on the screen of arriving client terminal 215. Optionally, as shown at 113, driving instructions for navigating to the location of departing vehicle 221 are presented on the screen of arriving client terminal 215.

Optionally, instructions to the location of departing vehicle 221 are also presented on the screen of departing client terminal 211, for example when the user of departing client terminal 211 forgets the location of departing vehicle 221.

Optionally, an indication may be presented on the screen of departing client terminal 211 to indicate a recommended time for starting to move toward departing vehicle 221, calculated based on an estimated walking time from the current location of departing client terminal 211 to departing vehicle 221 and the estimated arrival time of arriving vehicle 225, to minimize waiting time. Optionally, the estimated arrival time to departing vehicle 221 may be based on previous days, for example when the user departing client terminal 211 leaves every morning and the time it take for him to leave the house is similar each day. Optionally, the user of departing client terminal 211 and/or to the user of arriving client terminal 215 may cancel the matching. Optionally, cancellation is limited, for example by a certain time and/or distance before the departure time of departing vehicle 221 and/or the arrival time of arriving vehicle 225, for example 2 minutes before the predicted departure time.

Then, optionally, as shown at 111, confirmation is received by server 201 from arriving client terminal 215, indicating that the user of arriving client terminal 215 intends to bring arriving vehicle 225 to occupy the public parking space. Optionally, confirmation is also received by server 201 from departing client terminal 211 confirming that departing vehicle 221 is departing from the public parking space in the estimated departure time.

Then, optionally, when the user of departing client terminal 211 is still far from the public parking space and departing vehicle 221, arriving vehicle 225 may drive him to departing vehicle 221. Optionally, as shown at 112, driving instructions for navigating to the location of client terminal 211 are sent from server 201 to arriving client terminal 215 and presented on the screen of arriving client terminal 215, and then, as shown at 112, driving instructions for navigating to the location of departing vehicle 221 are sent from server 201 to arriving client terminal 215 and presented. Optionally, the user of arriving client terminal 215 may be presented with an option to drive the user of departing client terminal 211 to departing vehicle 221 or wait until he arrives.

Optionally, the driving instructions that are presented on the screen of arriving client terminal 215 are adjusted so the actual arrival time of arriving vehicle 225 is closer to the estimated departure time of departing vehicle 221 than the original estimated arrival time. For example, a longer route and/or a route with more traffic load may be instructed for arriving vehicle 225 to match the estimated departure time. Optionally, the driving instructions are automatically updated when the estimated departure time is updated.

Optionally, when the public parking space is inside a public parking lot, server 201 may be connected to a system operating the gate of said public parking space, to allow arriving vehicle 225 to enter the parking lot and/or allow departing vehicle 221 to exit the parking lot. For example, when a match is made, the details of arriving vehicle 225 are transferred to the gate system via a message, and the gate is opened when arriving vehicle 225 arrives. The identification of arriving vehicle 225 and/or departing vehicle 221 may be done, for example, by location of arriving client terminal 215 and/or departing client terminal 211, by identification of the vehicles' number plates for example by camera, and/or by any other method.

Optionally, a communication method is provided to the user of departing client terminal 211 and/or to the user of arriving client terminal 215, so they can easily coordinate the transfer of the public parking space. For example, a phone number of one user is provided to the other user and/or a chat option is opened between the two users.

Optionally, the user of departing client terminal 211 may indicate, using an indication provided in the user interface of client terminal 211, that there are many available parking spaces in the area and the match canceled. The indication is sent to arriving client terminal 215.

Then, optionally, as shown at 114, a transfer of the public parking space is identified by server 201. This may be done, for example, by a confirmation received from arriving client terminal 215 and/or from departing client terminal 211, and/or according to the speed of arriving vehicle 225 and/or of departing vehicle 221. For example, when arriving client terminal 215 is substantially stationary at the location of the public parking space and departing client terminal 211 is moving at a driving speed, a transfer of the public parking space is identified. Optionally, the transfer of the public parking space is identified by correlating between movements of departing client terminal 211 and of arriving client terminal 215, for example arriving vehicle 225 stops when departing vehicle 221 starts moving.

Optionally, commercial content is presented on the screens of departing client terminal 211 and/or arriving client terminal 215, based on the location of client terminal 211, arriving client terminal 215 and/or the public parking space. The commercial content may include, for example, advertisement and/or suggestions of places such as shops, restaurants and/or entertainment around these locations. The commercial content may include advertisement and/or suggestions of places related to the other user. Optionally, commercial content related to the user of departing client terminal 211 is presented on the screen of arriving client terminal 215, for example, commercial content related to a place visited by the user of departing client terminal 211 for example, a restaurant where the user ate and/or or a shop where the user shopped.

Optionally, the information of departing and arriving vehicles is sent to a system of the municipality, to assist in parking enforcement. For example, the system may indicate locations of vehicles parking longer than permitted time period. Optionally, parking enforcement is done automatically for example by server 201 and/or by a system of the municipality connected to server 201. Optionally, a street area may be defined by the municipality exclusively for vehicles using the system. Optionally, an alert may be presented on the screen of departing client terminal 211 when a parking enforcement agent is checking departing vehicle 221. Optionally, parking fee may automatically increase as penalty for parking longer than permitted time period.

In an exemplary scenario of leaving a parking space, the user interface of departing client terminal 211 may include an input form that allows the user of departing client terminal 211 to provide an estimated departure time. The user interface may include a map indicating the location of departing vehicle 221 and the locations of client terminals 215-218 is associated with a vehicle 225-228 currently moving, and may be requiring a parking space. The user of departing client terminal 211 may select one of client terminals 215-218 to transfer the parking space. Alternatively, a suggestion of a match may be presented to the user, optionally presenting the selected arriving vehicle on the map. The suggestion may be changed and/or updated based on updated location information. When a match is made, parking fee may stop increasing and may start decreasing for the user of departing client terminal 211.

Figure 3:
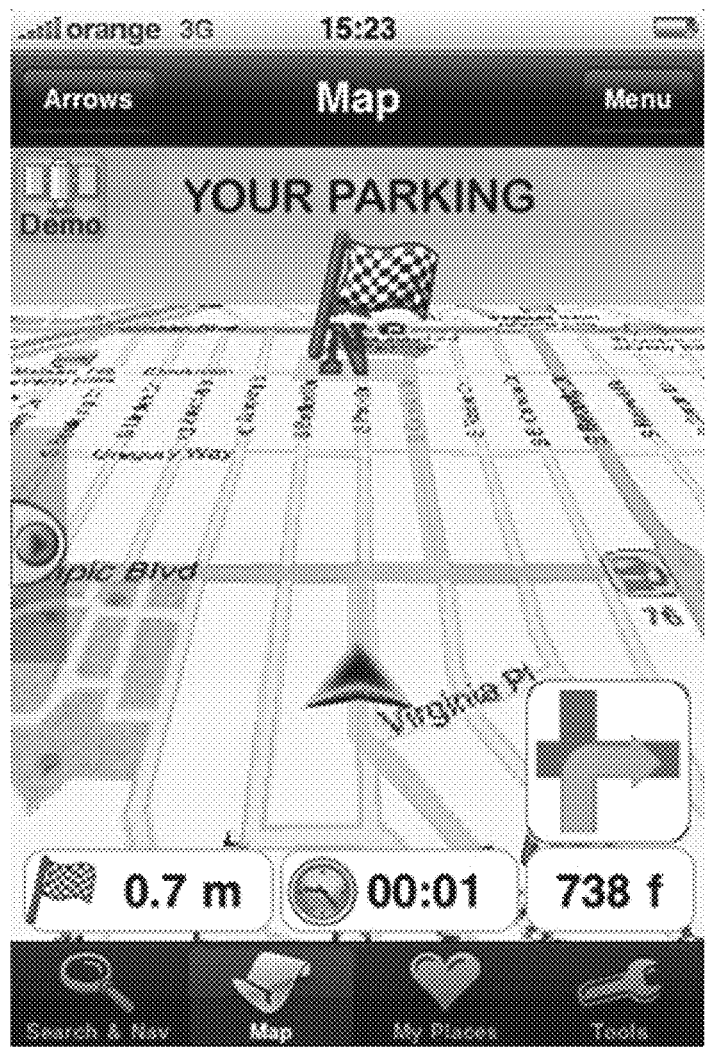
FIG. 3 is a schematic illustration of an exemplary user interface of arriving client terminal 215, according to some embodiments of the present invention.

Reference is now made to FIG. 3, which is a schematic illustration of an exemplary user interface of arriving client terminal 215, according to some embodiments of the present invention.

In an exemplary scenario of seeking a parking space, the user interface of arriving client terminal 215 may include an input form that allows the user of arriving client terminal 215 to provide an indication of seeking a parking space, and optionally a desired area for parking. The user interface may include a map indicating the location of vehicles 221-224 that may be departing and their estimated departure times. The map may include, for example, color indications of vehicles 221-224, of available parking spaces and/or any other indications. The user of arriving client terminal 215 may select one of vehicles 221-224 to receive the parking space. Alternatively, a suggestion of a possible match to one of vehicles 221-224 is presented to the user. The suggestion may be changed and/or updated based on updated location information, to provide an optimal match. For example, a suggestion may be made to match with departing vehicle 221 when arriving client terminal 215 is far from the final parking destination, however when getting closer to the parking area the suggestion changes and a final match is made with departing vehicle 222. When a match is made, parking fee may start increasing for the user of arriving client terminal 215.

Figure 4:
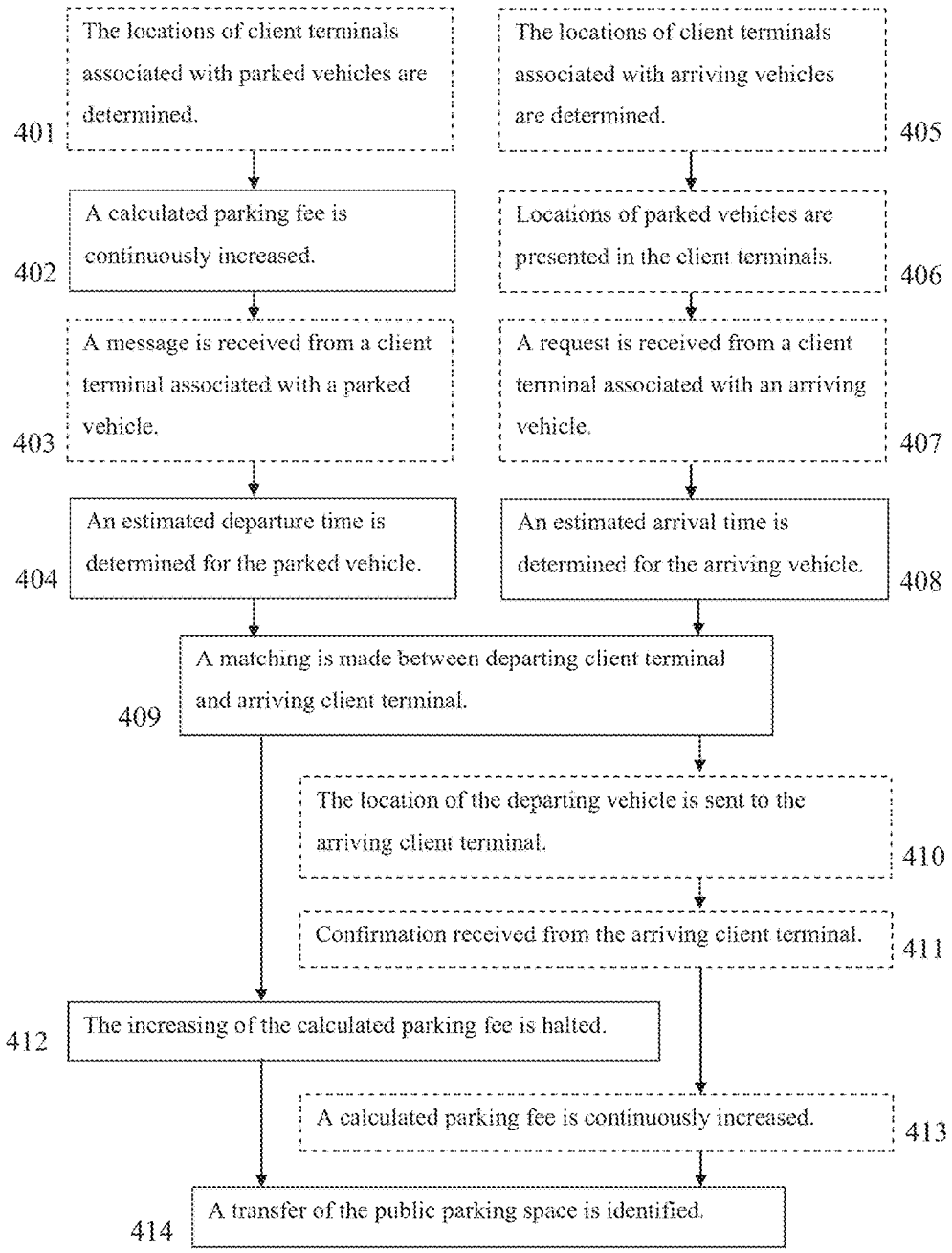
FIG. 4 is a flowchart schematically representing a method for calculating a parking fee in a public parking space, according to some embodiments of the present invention.
Figure 5:
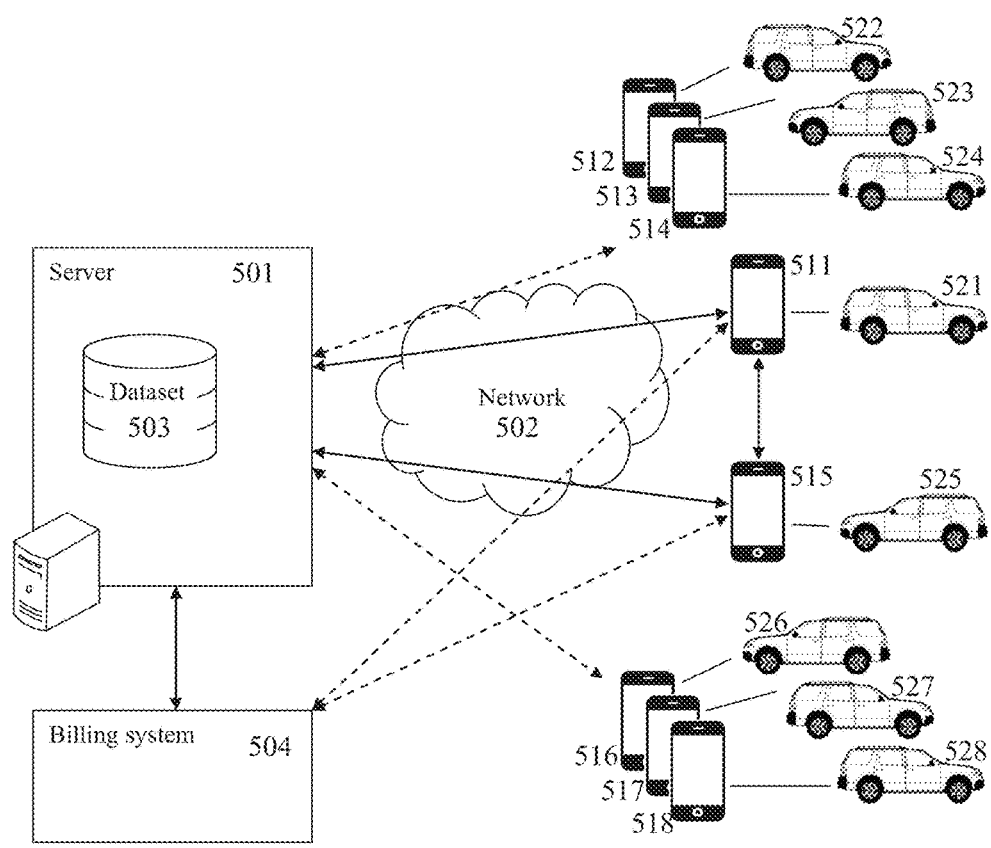
FIG. 5 is a schematic illustration of a system for calculating a parking fee in a public parking space, according to some embodiments of the present invention.

Reference is also made to FIG. 4, which is a flowchart schematically representing a method for calculating a parking fee in a public parking space, where the billing entity is changed before an actual transfer of the public parking space is done, according to some embodiments of the present invention. Reference is also made to FIG. 5, which is a schematic illustration of a system for calculating a parking fee in a public parking space, according to some embodiments of the present invention. 501-503, 511-518 and 521-528 are as described above for 201-203, 211-218 and 221-228.

First, as shown at 401, the location of multiple client terminals is monitored, as described above for 101.

Then, as shown at 402, a command is created by server 501 to calculate parking fee is continuously increased for some or all of parked vehicles 521-524, based on duration of occupying each public parking space. The command may be directed and/or transferred to a billing system 504, for example a billing system maintained by the municipality. Optionally, the command is created by departing client terminal 511 and/or by arriving client terminal 515, directly connected to billing system 504. Optionally, the parking fee is increased more rapidly when allowed or predetermined time for evacuating the public parking space is approaching and/or when the time has passed, so the parking fee is increased as penalty for not evacuating the public parking space on time. Optionally, the increasing may be slowed when a match with an arriving vehicle is found.

Then, as shown at 403-411, steps are made as described above for 103-111.

Then, as shown at 412, a command is created to halt the increasing of the calculated parking fee for departing vehicle 521. The command may be directed and/or transferred to billing system 504, as described above. Optionally, as shown at 413, a calculated parking fee is then continuously increased for arriving vehicle 525, starting from the time the confirmation is received and based on duration of occupying the public parking space.

Optionally, the user of departing client terminal 511 may be credited for leaving the public parking space, for example by payment, points, credited parking time and/or any other method. The credit may be calculated according to parking area, parking time limit, time of day and/or any other parameter. Optionally, the user of departing client terminal 511 may be credited for the time period between the match and the transfer of the public parking space, between the time of searching for a match and the transfer of the public parking space or between the time of user of departing client terminal 511 arriving to departing vehicle 521 and the transfer of the public parking space (the waiting for arriving vehicle 525). For example, the calculated parking fee for departing vehicle 521 may be reduced at the same or at a different amount, such as double or triple, of the increase of the parking fee, based on the time of waiting for arriving vehicle 525. Optionally, the credit may be decided by the user of departing client terminal 511, may be limited or defined by the municipality and/or may be defined according to current parking demand. Credit may also be received by the user of departing client terminal 511 when the time of paid parking is ended or when the public parking space is in a free parking zone, for example by points and/or by payment made by the user of arriving client terminal 515.

Optionally, the credit of the user of departing client terminal 511 for leaving the public parking space is paid by the user of arriving client terminal 515, by the municipality and/or a combination thereof.

Optionally, a business owner and/or other third party relating to the location of the public parking spot may pay for the credit, parking fee and/or other any other payment relating to the parking. For example, owner of a business located in proximity to the public parking spot may pay for the credit based on promotional material viewed by the users and/or based on the users' visiting and/or shopping at the business. Optionally, the business owner and/or third party may facilitate a match and a transfer of the public parking space. For example, the business owner may help a customer currently in the business find a match with an arriving vehicle, for example belonging to a potential customer currently arriving to the business and/or planning to arrive to the business.

Then, as shown at 414, a transfer of the public parking space is identified by server 501, as described above for 114.

Optionally, when a transfer of the public parking space is not performed as planned between departing vehicle 521 and arriving vehicle 525, the payment, credit and/or halting of the increasing of the calculated parking fee is canceled. Optionally, when a transfer of the public parking space is not performed however a parking of arriving vehicle 525 at the public parking space is identified, the credit of the user of departing client terminal 511 for leaving the public parking space may still be paid by the user of arriving client terminal 515 and/or penalty may be inflicted on the user of arriving client terminal 515.

Optionally, the parking fee is decreased for the user of departing client terminal 511 and/or user of arriving client terminal 515 when the users agree to view commercial content, for example presented on the screen(s) of the client terminal(s). The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems of managing parking space occupancy will be developed and the scope of the term management of parking space occupancy is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for improving navigation of a vehicle to parking space, comprising:
   using a server to function as a parking management server:
   continuously monitoring a location of each of a plurality of client terminals, each associated with a vehicle occupying a public parking space, said location is identified by a location sensor of each of said plurality of client terminals and transmitted to said server over a network;
   continuously monitoring a geographic location of a plurality of moving vehicles, each identified by a respective one of a plurality of location sensors, each associated with another one of a plurality of first client terminals associated with respective one of said plurality of moving vehicles, said geographic location is communicated over said network to said server by said associated first client terminal;
   wherein each of said plurality of client terminals and said plurality of first client terminals comprises at least a network communication module, said location sensor and a user interface on a screen;
   identifying within said plurality of moving vehicles, a plurality of arriving vehicles requiring a parking space;
   receiving, over said network, a message from a second client terminal associated with a parked vehicle, said message includes a notification of a future departure of said parked vehicle from said public parking space;
   calculating an estimated time of said future departure and an estimated arrival time of some of said arriving vehicles to said public parking space, based on a monitored current location of each of said some of said arriving vehicles;
   selecting one of said some of said plurality of arriving vehicles to occupy said public parking space instead of said parked vehicle when said parked vehicle is departing, based on a matching result between said estimated time of said future departure and said estimated arrival time of said some of said arriving vehicles;
   directing said selected arriving vehicle to said public parking space by:
      activating a client terminal of said selected arriving vehicle to function as navigation assistance user device;

transmitting an indication of a potentially available parking space to said arriving client terminal associated with said selected arriving vehicle, through said network, generating driving instructions for navigating said selected arriving vehicle to said public parking space, and sending said driving instructions for presentation on a screen of said arriving client terminal.

2. The method of claim 1, further comprising:

continuously increasing a calculated parking fee for a parked vehicle associated with one of said plurality of client terminals and currently occupying a public parking space, based on duration of said occupying;

automatically halting said increasing and start decreasing said calculated parking fee for said parked vehicle, while said parked vehicle is still parked before identifying a transferring of said public parking space; and start increasing a calculated parking fee for said selected arriving vehicle in accordance with said halting while said selected arriving vehicle is still not parked in said public parking space.

3. The method of claim 2, wherein said halting is done according to a time of said message.

4. The method of claim 2, wherein said halting is done according to a time of said selecting.

5. The method of claim 2, further comprising:

receiving confirmation from said arriving client terminal to occupy said public parking space.

6. The method of claim 5, wherein said halting is done according to a time of said confirmation.

7. The method of claim 2, further comprising:

when a transfer of the public parking space is not performed, said halting is canceled.

8. The method of claim 2, wherein commands for said increasing, said decreasing and said halting are sent to a billing system.

9. A non-transitory computer readable storage medium encoded with instructions that, when loaded into a computer, establish a machine performing:

using a server to function as a parking management server:

continuously monitoring a location of each of a plurality of client terminals, each associated with a vehicle occupying a public parking space, said location is identified by a location sensor of each of said plurality of client terminals and transmitted to said server over a network;

continuously monitoring by said server, a geographic location of a plurality of moving vehicles, each identified by a respective one of a plurality of location sensors, each associated with another one of a plurality of first client terminals associated with respective one of said plurality of moving vehicles, said geographic location is communicated over said network to said server by said associated first client terminal;

wherein each of said plurality of client terminals and said plurality of first client terminals comprises at least a network communication module, said location sensor and a user interface on a screen;

identifying within said plurality of moving vehicles, a plurality of arriving vehicles requiring a parking space;

receiving, over said network, a message from a second client terminal associated with a parked vehicle, said message includes a notification of a future departure of said parked vehicle from said public parking space;

calculating an estimated time of said future departure and an estimated arrival time of some of said arriving vehicles to said public parking space, based on a monitored current location of each of said some of said arriving vehicles;

selecting one of said some of said plurality of arriving vehicles to occupy said public parking space instead of said parked vehicle when said parked vehicle is departing, based on a matching result between said estimated time of said future departure and said estimated arrival time of said some of said arriving vehicles;

directing said selected arriving vehicle to said public parking space by:

activating a client terminal of said selected arriving vehicle to function as navigation assistance user device;

transmitting an indication of a potentially available parking space to said arriving client terminal associated with said selected arriving vehicle, through said networks, generating driving instructions for navigating said selected arriving vehicle to said public parking space, and sending said driving instructions for presentation on a screen of said arriving client terminal.

10. A system of efficiently navigating a vehicle to a parking space, comprising:

a program store storing code; and a processor coupled to said program store for implementing said stored code, said code comprising:

code to use a server to function as a parking management server:

code to continuously monitor a geographic location of each of a plurality of client terminals, each associated with a vehicle occupying a public parking space, said location is identified by a location sensor of each of said plurality of client terminals and transmitted to said server over a network;

code to continuously monitor a geographic location of a plurality of moving vehicles, each identified by a respective one of a plurality of location sensors, each associated with another one of a plurality of first client terminals associated with respective one of said plurality of moving vehicles, said geographic location is communicated over said network to said server by said associated first client terminal;

wherein each of said plurality of client terminals and said plurality of first client terminals comprises at least a network communication module, said location sensor and a user interface on a screen;

code to identify within said plurality of moving vehicles, a plurality of arriving vehicles requiring a parking space;

code to receive over said network, a message from a second client terminal associated with a parked vehicle, said message includes a notification of a future departure of said parked vehicle from said public parking space;

code to calculate an estimated time of said future departure and an estimated arrival time of some of said arriving vehicles to said public parking space, based on a monitored current location of each of said some of said arriving vehicles;

code to select one of said some of said plurality of arriving vehicles to occupy said public parking space instead of said parked vehicle when said parked vehicle is departing, based on a matching result between said estimated time of said future departure and said estimated arrival time of said some of said arriving vehicles;

code to direct said selected arriving vehicle to said public parking space by:

activating a client terminal of said selected arriving vehicle to function as navigation assistance user device;

transmitting an indication of a potentially available parking space to said arriving client terminal associated with said selected arriving vehicle, through said network, and generating driving instructions for navigating said selected arriving vehicle to said public parking space, and sending said driving instructions for presentation on a screen of said arriving client terminal.

11. The method of claim 1, wherein said selected arriving vehicle is an autonomous vehicle and said client terminal is connected to a vehicle's computer of said autonomous vehicle.

12. The non-transitory computer readable storage medium of claim 9, wherein said selected arriving vehicle is an autonomous vehicle and said client terminal is connected to a vehicle's computer of said autonomous vehicle.

13. The system of claim 10, wherein said selected arriving vehicle is an autonomous vehicle and said client terminal is connected to a vehicle's computer of said autonomous vehicle.

* * * * *